US012659634B2

(12) United States Patent
Ra et al.

(10) Patent No.: US 12,659,634 B2
(45) Date of Patent: Jun. 16, 2026

(54) APPARATUS AND METHOD FOR SLICING RESOURCES IN PASSIVE OPTICAL NETWORK SYSTEMS

(71) Applicant: ELECTRONICS AND TELECOMMUNICATIONS RESEARCH INSTITUTE, Daejeon (KR)

(72) Inventors: Yong Wook Ra, Daejeon (KR); Chansung Park, Daejeon (KR); Hwan Seok Chung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 265 days.

(21) Appl. No.: 18/510,828

(22) Filed: Nov. 16, 2023

(65) Prior Publication Data

US 2024/0244356 A1     Jul. 18, 2024

(30) Foreign Application Priority Data

Jan. 18, 2023     (KR) ........................ 10-2023-0007495

(51) Int. Cl.
  *H04Q 11/00*          (2006.01)
  *H04B 10/27*          (2013.01)
(52) U.S. Cl.
  CPC ......... *H04Q 11/0067* (2013.01); *H04B 10/27* (2013.01); *H04Q 2011/0086* (2013.01)
(58) Field of Classification Search
  CPC ............... H04B 10/27; H04Q 11/0067; H04Q 2011/0086

USPC ......................................................... 398/204
See application file for complete search history.

(56) References Cited

U.S. PATENT DOCUMENTS

| | | | |
|---|---|---|---|
| 11,575,439 B1 * | 2/2023 | Yigit | G06F 9/547 |
| 12,212,361 B2 * | 1/2025 | Kodaypak | H04B 10/25752 |
| 2010/0316383 A1 | 12/2010 | Kim et al. | |
| 2011/0099563 A1 | 4/2011 | Shin et al. | |

(Continued)

FOREIGN PATENT DOCUMENTS

| | | | |
|---|---|---|---|
| EP | 3886493 A1 | 9/2021 | |
| KR | 10-2008-0076917 A | 8/2008 | |

(Continued)

*Primary Examiner* — Dalzid E Singh
(74) *Attorney, Agent, or Firm* — LRK PATENT LAW FIRM

(57)          ABSTRACT

Provided are apparatus and method for slicing resources in passive optical network systems. The method includes identifying network elements included in a plurality of physical passive optical networks (pPONs), abstracting the identified network elements so that the identified network elements are recognized as the same software (SW) block, generating a plurality of PON slices by performing PON slicing on the abstracted network elements in accordance with a predetermined reference, and generating a plurality of virtual PONs (vPONs) by mapping the plurality of PON slices to at least one network element. The predetermined reference is determined on the basis of an attribute of at least one of ports and transmission containers (T-CONTs) corresponding to the identified network elements, and the at least one network element includes an optical network unit (ONU).

14 Claims, 13 Drawing Sheets

(56)        References Cited

U.S. PATENT DOCUMENTS

2016/0088377  A1*    3/2016  Peng .................. H04L 41/0806
                                                                    398/45
2019/0215243  A1     7/2019  Wang et al.

FOREIGN PATENT DOCUMENTS

KR       10-2008-0084741  A     9/2008
KR       10-2012-0012804  A     2/2012
KR       10-2013-0047489  A     5/2013
KR       10-2016-0030283  A     3/2016
KR       10-2021-0089233  A     7/2021

* cited by examiner (410) ① Slice Nuber: #1, BW:3G, DBA-1:SBA, pOLT #1→PON Port #1→Remained BW:7G
(420) ② Slice Nuber: #2, BW:5G, DBA-2:SBA, pOLT #1→PON Port #2→Remained BW:5G
(430) ③ Slice Nuber: #3, BW:5G, DBA-3: SR-DBA, pOLT #1→PON Port #2→Remained BW:0G
(440) ④ Slice Nuber: #4, BW:5G, DBA-4: SR-DBA, pOLT #2→PON Port #1→Remained BW:5G
(450) ⑤ Slice Nuber: #5, BW:13G, DBA-5: SR-DBA, pOLT #2→PON Port #1→Remained BW:2G
pOLT #2→PON Port #2→Remained BW:0G
(460) ⑥ Slice Nuber: #6, BW:10G, DBA-6: CO-DBA, pOLT #2→PON Port #3→Remained BW:0G

Fig. 5

| Device Type | Admin | Connection | Operational |
|---|---|---|---|
| ANY(OLT/ONU) | Pre-provisioned | Unknown | Unknown |
| ANY(OLT/ONU) | Enabled | Unknown | Unknown |
| ANY(OLT/ONU) | Disabled | Unknown | Unknown |
| ANY(OLT/ONU) | Enabled | Unknown | Active |
| ANY(OLT/ONU) | Enabled | Unknown | Activating |
| ANY(OLT/ONU) | Unknown | Unknown | Unknown |
| OLT | Enabled | Reachable | Active |
| OLT | Disabled | Reachable | Unknown |
| OLT | Enabled | Unreachable | Unknown |
| OLT | Disabled | Unreachable | Unknown |
| ONU | Enabled | Unknown | Discovered |
| ANY(OLT/ONU) | Downloading IMAGE | Unknown | Unknown |

APPARATUS AND METHOD FOR SLICING RESOURCES IN PASSIVE OPTICAL NETWORK SYSTEMS

CROSS-REFERENCE TO RELATED APPLICATION

This application claims priority to and the benefit of Korean Patent Application No. 10-2023-0007495, filed on Jan. 18, 2023, the disclosure of which is incorporated herein by reference in its entirety.

BACKGROUND

1. Field of the Invention

The present invention relates to a method of separating network elements (e.g., an optical line terminal (OLT), an optical network terminal (ONT), an optical network unit (ONU), and the like) of a wide access network into a data plane and a control plane and controlling and managing the wide access network through centralized integrated control using one piece of logical equipment, and more particularly, to a passive optical network (PON) slicing method and device for generating, updating, and reconfiguring PON resources to allow service-specific bandwidth management by abstracting resources of a wide access network including multiple physical OLTs and physical ONUs into PON resources using one large piece of network equipment, logically slicing the abstracted PON resources by service under central control management, and flexibly setting slice-specific maximum bandwidths, guaranteed bandwidths, and dynamic bandwidth allocation (DBA) algorithm selection in transmission container (T-CONT)-level attributes as well as port level attributes through dynamic slice instance setting.

2. Description of Related Art

To accommodate sharply increasing data traffic, in today's data access networks, introduction of optical access network technology that reduces dependence on hardware (HW), is easy to expand, and has flexible characteristics in providing network functions is being attempted. However, in existing optical access network equipment, a control plane (configured as software (SW)) for performing a management control function and a data plane (configured as HD) for performing a function of providing a data path for traffic including layer 2 functions and layer 1 functions are integrated, and thus the optical access network equipment is implemented as an objective-oriented fixed-function device. Accordingly, there are limitations on replacing and adding new functions to optical access network equipment, and it is necessary to allocate ports in minimum units for each resource to provide services with difference requirements and characteristics, such as mobile, residential, and business services, leading to bandwidth waste due to service-specific passive optical network (PON) ports and port-specific functional limitations.

To solve the problems of a fixed-function device in an optical access network, the following two methods are considered. According to the first method, optical access network equipment (e.g., a white-box optical line terminal (OLT)) is disaggregated into a control plane (SW) and a data plane (HW) using SW defined networking (SDN) and network function virtualization (NFV) to facilitate an increase in HW capacity in the form of a white box and addition/ deletion of SW functions. According to the second method, even when HW equipment having different interfaces for various access technologies (gigabit-PON (GPON), 10-gigabit symmetrical (XGS)-PON, next generation passive optical network stage 2 (NG-PON2), and 25-gigabit capable asymmetric and symmetric (25GS)-PON)) coexists, HW abstraction technology is added between optical access equipment and a control plane to provide a single interface between the control plane and a data plane so that an optical access network does not have vendor-specific equipment or technical dependency.

Like this, an optical access network having a disaggregated structure or an HW abstraction and virtualization structure may remove dependency on vendor- and technology-specific HW and group virtualization functions required for configuring complex network elements thereof and thus may be simply applied to physical PON equipment, such as a white-box (WB) OLT. However, ports of a physical WB OLT correspond to ports of abstracted OLT equipment on a one-to-one basis, which limits equipment utilization. Also, it is necessary to rapidly change a network architecture according to attributes of each service to be provided by the optical access network, and manage physical network resources in traffic scheduler units in a cost-efficient manner. In addition, to provide various services with different flow attributes (e.g., bandwidth, priority, latency, and the like), it is necessary to perform N-to-M mapping subdivided at a T-CONT level rather than one-to-one mapping between ports and services and control and manage resources of an optical access network in an integrative manner, and to logically generate, update, and redistribute each resource, centralized integrated control is necessary.

SUMMARY OF THE INVENTION

The present invention is directed to providing a physical network resource management device and method for removing a physical network's dependency on hardware (HW) by separating network elements of an optical access network configured as a fixed-function device in an integrative manner into a data plane (HW) and a control plane (SW) using an abstraction and virtualization technology, providing physical passive optical network (pPON) resources in port/ traffic-scheduler units by controlling and managing the optical access network through a centralized controller using one piece of logical equipment, and thereby providing a slice configuration appropriately for service requirements.

The present invention is also directed to providing a device and method for flexibly configuring and setting a service slice having port/transmission container (T-CONT) level attributes (a maximum bandwidth, a guaranteed bandwidth, priority, a relative weight, a latency class, and dynamic bandwidth allocation (DBA)) through dynamic slice instance setting in centralized integrated control, classifying network elements by slice service type (mobile, business, and residential) through a subscriber grouping function, and providing flexible service management in a virtual PON (vPON) and subdivided optical access network slicing for each subscriber group.

The present invention is also directed to providing a PON slicing device and method for configuring a vPON by mapping a plurality of optical network units (ONUs) including multiple T-CONTs in a pPON to logical PON slices, appropriately selecting and controlling various bandwidth allocation methods for service requirements in the vPON, and thus assigning identical ONUs to one PON slice for each slice service type (mobile, business, and residential) in an optical access network for providing a slicing service in T-CONT units (assigning multiple T-CONTs in the same ONU to one slice) or assigning multiple ONUs to one PON slice (assigning multiple T-CONTs in multiple ONUs to one slice) and assigning one ONU to a plurality of PON slices (assigning multiple T-CONTs in one ONU to a plurality of different slices) at the same time.

The present invention is also directed to providing a PON slicing method of configuring a service (T-CONT units) to be used by an ONU on the basis of a dynamically configurable slice profile (a maximum bandwidth/guaranteed bandwidth, priority, a relative weight (compared to other slices), a latency class, and whether to use a cooperative DBA (Co-DBA)).

The present invention is also directed to providing a dynamic bandwidth allocation control method for managing total bandwidth and currently remaining bandwidth information for each PON port, determining whether a currently remaining bandwidth is exceeded when provisioning of a new slice instance is requested, and determining whether a bandwidth allocated to a corresponding subscriber is smaller than a remaining bandwidth of a slice instance to be provisioned when the subscriber is provisioned, for the purpose of preventing the sum of maximum bandwidths of PON slices from exceeding a maximum bandwidth of each PON port set in a pPON.

According to an aspect of the present invention, there is provided an operating method of an electronic device including identifying network elements included in a plurality of pPONs, abstracting the identified network elements so that the identified network elements are recognized as the same software (SW) block, generating a plurality of PON slices by performing PON slicing on the abstracted network elements in accordance with a predetermined reference, and generating a plurality of vPONs by mapping the plurality of PON slices to at least one network element. The predetermined reference is determined on the basis of an attribute of at least one of ports and T-CONTs corresponding to the identified network elements, and the at least one network element includes an ONU.

The identified network elements included in the plurality of pPONs may be separated into a data plane and a control plane.

The operating method may further include transmitting and receiving data through network elements on the data plane mapped to the plurality of generated vPONs.

The transmitting and receiving of the data may further include allocating bandwidths to the plurality of vPONs using a bandwidth allocation method varying depending on a service type provided by a service provider in accordance with requirements of a user who uses the plurality of vPONs.

The generating of the plurality of vPONs may further include generating a plurality of vPONs in the control plane by reconfiguring the plurality of abstracted network elements in accordance with a service type provided by a service provider.

The attribute of the at least one of the ports and the T-CONTs may be an attribute related to at least one of a maximum bandwidth, a guaranteed bandwidth, priority, a relative weight, a latency class, and a DBA type.

The operating method may further include identifying a new network element, identifying port information corresponding to the new network element, acquiring PON slice information corresponding to the port information, identifying a PON port for the PON slicing on the basis of the PON slice information, determining whether a remaining bandwidth (RBW) of the identified PON port satisfies a predetermined bandwidth on demand, and when the RBW of the identified PON port satisfies the predetermined bandwidth on demand, setting the PON slice information. The PON slice information may include information related to at least one of the PON port, a flow, a bandwidth, and DBA.

The operating method may further include, when the RBW of the identified PON port does not satisfy the predetermined bandwidth on demand, identifying another PON port on the basis of the PON slice information and determining whether an RBW of the identified PON port satisfies the predetermined bandwidth on demand.

According to another aspect of the present invention, there is provided an electronic device including a transceiver and at least one controller operably connected to the transceiver. The at least one controller is configured to identify network elements included in a plurality of pPONs, abstract the identified network elements so that the identified network elements are recognized as the same SW block, generate a plurality of PON slices by performing PON slicing on the abstracted network elements in accordance with a predetermined reference, and generate a plurality of vPONs by mapping the plurality of PON slices to at least one network element. The predetermined reference is determined on the basis of an attribute of at least one of ports and T-CONTs corresponding to the identified network elements, and the at least one network element includes an ONU.

The identified network elements included in the plurality of pPONs may be separated into a data plane and a control plane.

The at least one controller may be further configured to transmit and receive data through network elements on the data plane mapped to the plurality of generated vPONs.

To transmit and receive the data, the at least one controller may be further configured to allocate bandwidths to the plurality of vPONs using a bandwidth allocation method varying depending on a service type provided by a service provider in accordance with requirements of a user who uses the plurality of vPONs.

To generate the vPONs, the at least one controller may be further configured to generate a plurality of vPONs in the control plane by reconfiguring the plurality of abstracted network elements in accordance with a service type provided by a service provider.

The attribute of the at least one of the ports and the T-CONTs may be an attribute related to at least one of a maximum bandwidth, a guaranteed bandwidth, priority, a relative weight, a latency class, and a DBA type.

The at least one controller may be further configured to identify a new network element, identify port information corresponding to the new network element, acquire PON slice information corresponding to the port information, identify a PON port for the PON slicing on the basis of the PON slice information, determine whether an RBW of the identified PON port satisfies a predetermined bandwidth on demand, and set the PON slice information when the RBW of the identified PON port satisfies the predetermined bandwidth on demand. The PON slice information may include information related to at least one of the PON port, a flow, a bandwidth, and DBA.

The at least one controller may be further configured to, when the RBW of the identified PON port does not satisfy the predetermined bandwidth on demand, identify another PON port on the basis of the PON slice information and determine whether an RBW of the identified PON port satisfies the predetermined bandwidth on demand.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 5 is a table showing a state transition map of an abstraction core in the HW abstraction block (112) according to an exemplary embodiment of the present invention;

DETAILED DESCRIPTION OF EXEMPLARY EMBODIMENTS

In this specification, the phrases "some embodiments," "an embodiment," and the like do not all necessarily indicate the same embodiment.

Some embodiments of the present invention may be represented by functional blocks and various processing operations. Some or all of the functional blocks may be implemented by a plurality of hardware (HW) and/or software (SW) elements that execute specific functions. For example, the functional blocks of the present invention may be implemented by one or more microprocessor or circuit elements for certain functions. Also, for example, the functional blocks of the present invention may be implemented in various programming or scripting languages. The functional blocks may be implemented as algorithms that are executed by one or more processors. In addition, the present invention may employ the related art for electronic environment settings, signal processing, data processing, and/or the like. The terms "mechanism," "element," "means," "configuration," and the like may be used in a broad sense, and are not limited to mechanical and physical elements.

Connection lines or connection members between components shown in the accompanying drawings merely exemplify functional connections and/or physical or circuit connections. Connections between components may be indicated as various replaceable or additional functional connections, physical connections, or circuit connections in a real apparatus.

Hereinafter, a device and method for building a virtual passive optical network (vPON) to allow service-specific bandwidth management in an optical access network according to embodiments of the present invention will be described.

The device may be referred to below as "electronic device" or "PON slicing device 100," and the method may be referred to as "operating method of an electronic device" or "PON slicing method."

Figure 1:
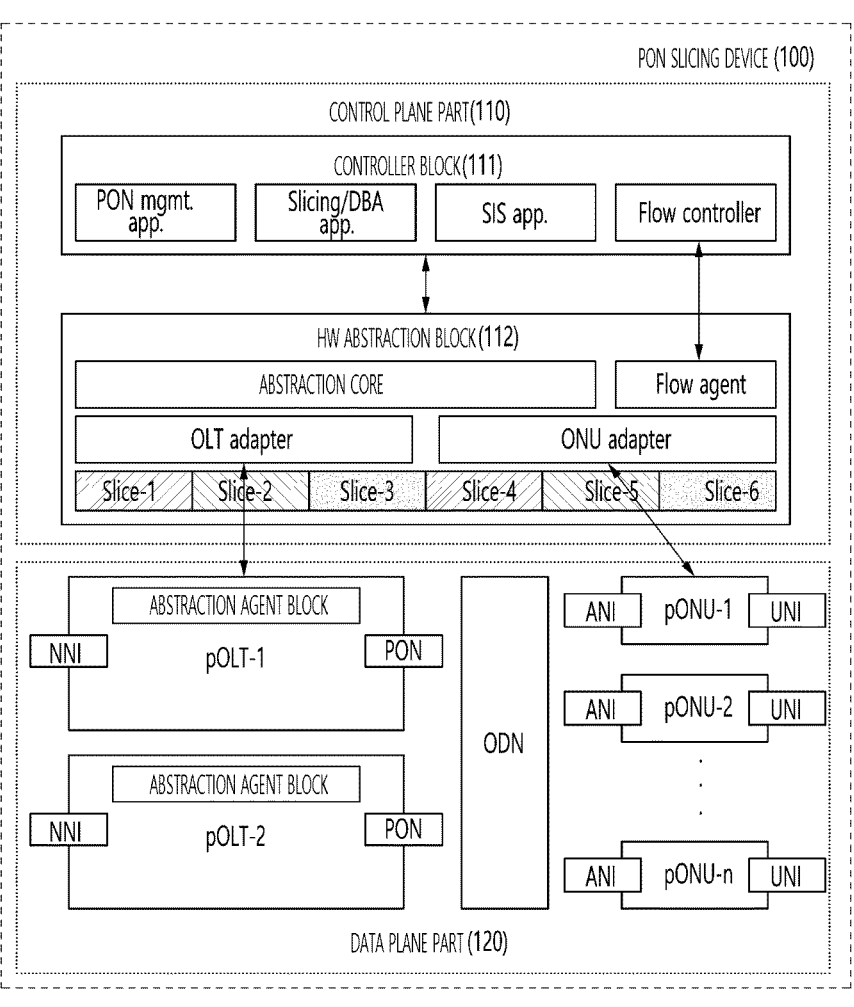
FIG. 1 is a diagram illustrating a structure of a passive optical network (PON) slicing device (100) for slicing a virtual PON (vPON) and providing a service in an optical access network according to an exemplary embodiment of the present invention.

FIG. 1 is a diagram illustrating a structure of the PON slicing device 100 for slicing a vPON and providing a service in an optical access network according to an exemplary embodiment of the present invention.

Referring to FIG. 1, the PON slicing device structure may divide a vPON into six slices and provide a service in an optical access network in which two physical optical line terminals (pOLTs) and N physical optical network units (pONUs) are deployed.

More specifically, the PON slicing method and device 100 of the present invention may separate optical access elements into a control plane part 110 and a data plane part 120.

The control plane part 110 may control and manage PON slicing for each service slice so that the optical access network can be controlled and managed through centralized integrated control using one piece of logical equipment.

The data plane part 120 may logically classify service slices of a physical PON (pPON) obtained through PON slicing to provide paths of transmission or reception packets.

In the present invention, as elements of the optical access network, pOLTs, pONUs, and an optical distribution network (ODN) may be collectively referred to as "pPONs," and on the other hand, virtual OLTs (vOLTs) and virtual ONUs (vONUs) may be collectively referred to as "vPONs."

The control plane part 110 may include a controller block 111 and an HW abstraction block 112. The data plane part 120 may include multiple pOLTs, an ODN, and multiple pONUs.

The controller block 111 may set and manage various application components and virtual network functions (VNFs) so that the optical access network may be sliced for each service, such as management, VNF defining, virtual local area network (VLAN) management for each subscriber, dynamic bandwidth allocation (DBA), and the like, on the basis of abstracted pPON information. The application components may control all optical access network elements and the like and perform various management functions for running the optical access network. More specifically, the controller block 111 may include a PON management (mgmt.) app, a slicing/DBA app, and a slice information service (SIS) app, which are app components, and a flow controller.

The PON mgmt. app of the controller block 111 may perform a flow management function for a subscriber's data path and a function of generating and controlling a logical device through a command line interface (CLI). In the case of installing a flow, the flow may be generated by reading VLAN information (customer (C)-tag which is inner VLAN information and service provider (S)-tag which is outer VLAN information) and bandwidth information (a bandwidth profile (BP)) on the basis of subscriber information registered in the SIS app.

The slicing/DBA app of the controller block 111 may manage a guaranteed bandwidth (fixed/assured bandwidth) allowed for managing slice instances for PON ports and remaining bandwidths for the instances and a guaranteed bandwidth which is available for each slice in each port to additionally allocate a bandwidth to a new slice or process a bandwidth adjustment request for an existing slice. The slice/DBA app is required to inquire of the HW abstraction block 112 a DBA algorithm, ports, port-specific bandwidths, and transmission containers (T-CONTs), which are physical information supported by pPONs, and a technology profile (TP) (a P-bit mapper, the number of traffic queues (a gigabit passive optical network (GPON) encapsulation method (GEM)), a GEM port scheduling policy, a weight and discard policy, the number of T-CONTs, T-CONT priority queue assignment, and the like), which is logical information managed by the HW abstraction block 112, and the inquired information is required to be processed through one stage by the slice/DBA app and transmitted through RESTful application programming interface (API).

Also, it is necessary to provision a slice instance in accordance with an administrator's port and bandwidth requirements through the CLI, and the CLI is required to interoperate the PON mgmt. app to include slice instance information in subscriber provisioning. Parameters required for newly generating a slice or changing a bandwidth setting may include a logical device identifier (ID), an OLT port number, a slice name, and a bandwidth, and parameters required for deleting a slice may include a logical device ID, an OLT port number, and a slice name.

The SIS app of the controller block 111 is an app for storing and managing information of a logical device. When a subscriber is registered through the CLI, the SIS app provides BP information to be used by the subscriber and a bandwidth available for each port to the PON mgmt. app. The SIS app is basically required to map an allocated slice and DBA information to each subscriber and manage the mapping information in addition to basic subscriber information. Also, the mapping information is referred to in actual slice provisioning and thus is required to be accessible through the PON mgmt. app.

The flow controller of the controller block 111 reads a profile value which is generated in a specified name of a BP (minimum, maximum, and guaranteed bandwidths) in which service parameters related to a bandwidth are defined and transmits a corresponding flow message of a flow generated by the PON mgmt. app to the HW abstraction block 112. In accordance with the flow message, an appropriate TP for a pPON may be selected, and a mapping between a flow ID and flow attribute may be performed to select DBA.

The HW abstraction block 112 may be a subject that minimizes dependency on HW by abstracting a pPON as a simple logical switch so that actual pPON equipment may be recognized as the same SW block by the controller block 111, and hides and manages details of a PON level (T-CONTs, a GEM, an ONU management control interface (OMCI), a scheduling policy, and the like). More specifically, the HW abstraction block 112 may include an abstraction core function, an OLT/ONU adapter function, and a flow agent function.

The abstraction core function of the HW abstraction block 112 is a key function for PON management and may include a key/value (K/V) storage for storing and managing setting and state information of pPON devices. The core function of the HW abstraction block 112 may execute logic for analyzing and processing messages received from the controller block 111 and interfaces including pPONs in the data plane part 120 and may generate execution results as new messages and then forward the new messages to the interfaces. The core function of the HW abstraction block 112 may manage each of vPONs to which pPONs (pOLTs and pONUs) are logically mapped as one logical switch.

The flow agent function of the HW abstraction block 112 may perform a flow setting function required for each device by separating a flow setting request received from the controller block 111 to each device of a corresponding pPON mapped to each slice of a vPON.

The OLT/ONU adapter function of the HW abstraction block 112 may open an interface and control pPON (pOLTs and pONUs) adaptation and pPONs to reduce dependency on various vendors' equipment. The OLT and ONU adapters may perform a communication function with each pOLT and pONU and transmit corresponding setting information by generating an appropriate interface message for each device. Each adapter may transmit and receive information through the core function of the HW abstraction block 112 and a message bus (e.g., Kafka), and also in communication between the adapters, information may be transmitted and received through the message bus. The ONU adapter may generate an OMCI message for setting each pONU, pass the OMCI message through the OLT adapter using the message bus, and transmit the OMCI message to a corresponding pOLT connected to the pONU through an open interface. The corresponding pOLT may transmit the OMCI message received from the OLT adapter to each pONU through an OMCI channel.

The HW abstraction block 112 may also include a technology for abstracting the OMCI that manages a standard for a management information base (MIB) and a management control channel between pOLTs and pONUs.

To configure a data path of the data plane part 120, the HW abstraction block 112 with this structure may configure settings of several attributes (e.g., T-CONTs, GEM ports, a scheduling policy, a discard policy, a latency class, and DBA) and a flow setting received from the controller block 111 for each slice differently depending on slice-specific characteristics (e.g., a TP, a BP, and a slice profile).

The data plane part 120 may include the multiple pOLTs, the ODN, and the multiple pONUs, and each of the pOLTs may have an abstraction agent block including an open interface with the HW abstraction block 112. To extract HW attribute settings (e.g., T-CONTs, T-CONT priority queue allocation, weight and discard policies, the number of GEM ports, P-bit mapping, a GEM port scheduling policy, and the like) of pOLTs and pONUs from a flow and the OMCI message received from the HW abstraction block 112 and find a traffic forwarding path, information required for generating a lookup table may be extracted, and key and result values may be set. Further, slices may be separated according to provided services, and in the case of setting pOLTs and related pONUs according to service characteristics, a DBA method (static bandwidth allocation (SBA), status reporting (SR)-DBA, cooperative DBA (Co-DBA), or the like) may be set differently at a level of T-CONTs which are minimum units for providing a service. Also, HW attributes, such as a T-CONT (an allocation (Alloc)-ID)), GEM ports, a scheduling policy, and a VLAN, and a flow for configuring an OMCI data path may be set according to the separated slices. A T-CONT may be identified using an Alloc-ID, and a GEM port may be uniquely identified using a GEM port ID.

The PON slicing device 100 with this structure controls and manages an optical access network using one piece of logical equipment by performing centralized integrated control and thus can provide pPON resources in units of ports/T-CONTs according to service requirements, that is, provide physical network resources according to characteristics of each service slice.

Figure 2:
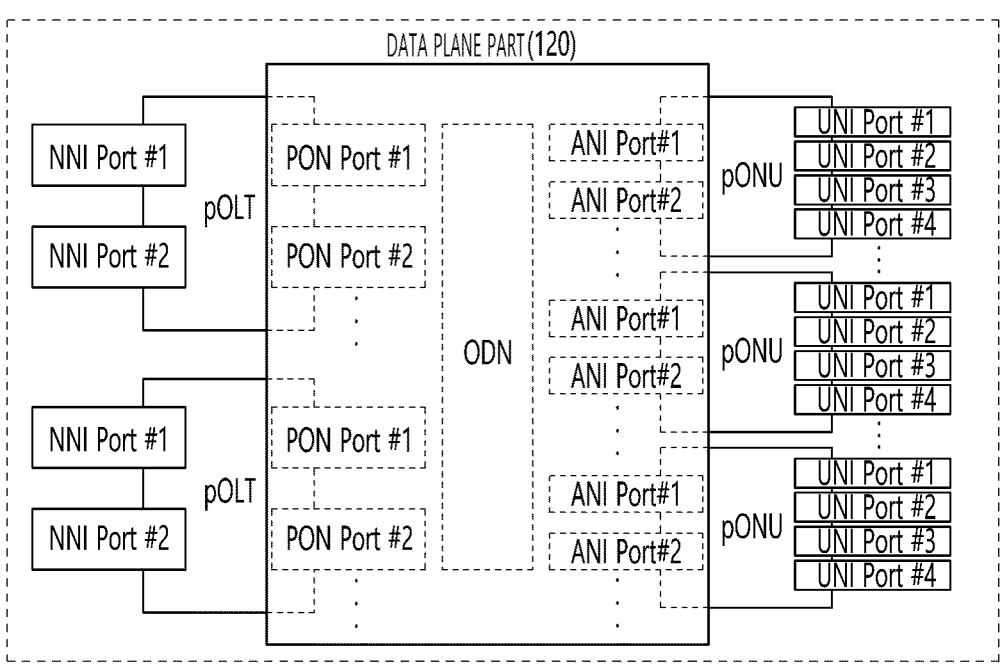
FIG. 2 is a diagram illustrating an abstraction structure of a physical PON (pPON) data plane part (120) obtained through a hardware (HW) abstraction block (112) according to an exemplary embodiment of the present invention.

FIG. 2 is a diagram illustrating an abstraction structure of the pPON data plane part 120 obtained through the HW abstraction block 112 according to an exemplary embodiment of the present invention.

In order for the controller block 111 to recognize actual pPON equipment as the same SW block, the HW abstraction block 112 minimizes dependency on HW by abstracting a pPON as a simple logical switch, showing only network-to-network interface (NNI) ports and user network interface (UNI) ports, and hiding details of a PON level (PON ports, application-to-network interface (ANI) ports, T-CONTs, a GEM, an OMCI, a scheduling policy, and the like). However, actual PON slicing is configurable at a traffic scheduler level, and thus the details of the PON level may be managed in the HW abstraction block 112.

Figure 3:
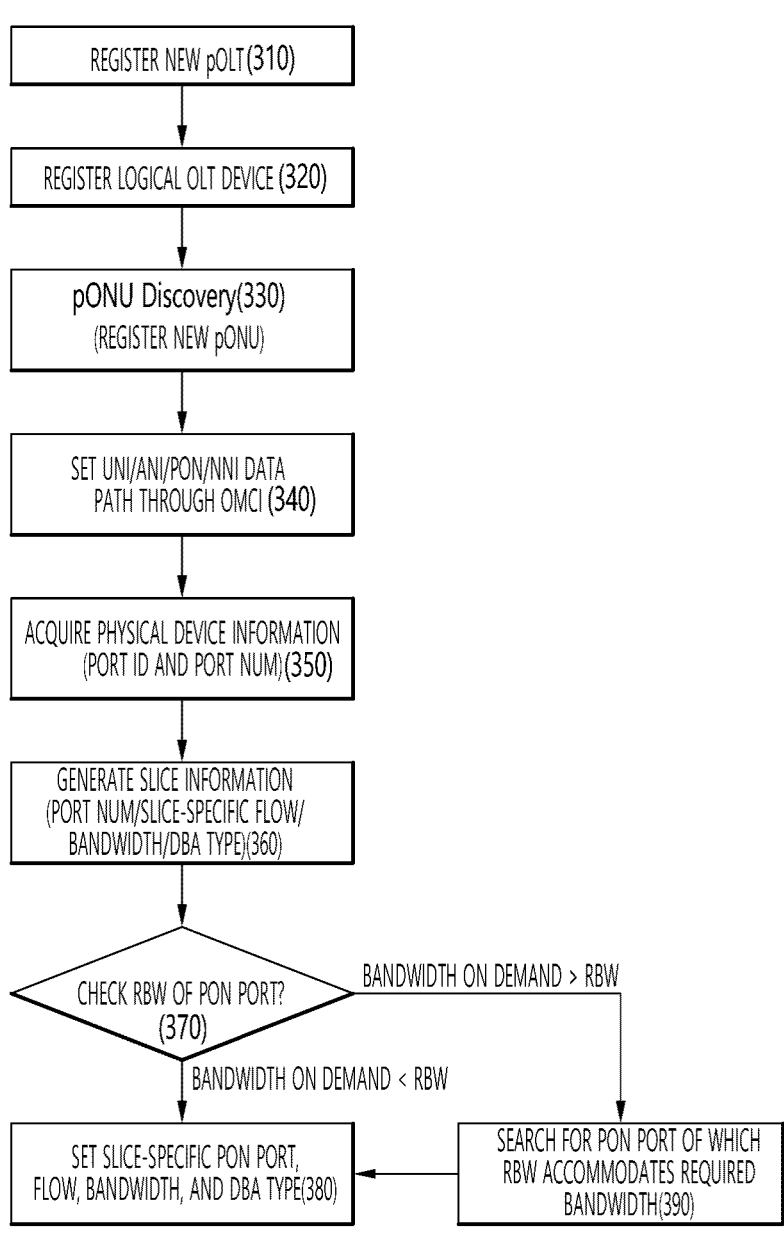
FIG. 3 is a flowchart illustrating a slice generation operation for a new optical line terminal (OLT)/optical network unit (ONU) registration procedure according to an exemplary embodiment of the present invention.

FIG. 3 is a flowchart illustrating a slice generation operation for a new OLT/ONU registration procedure according to an exemplary embodiment of the present invention.

Referring to FIG. 3, when a new pOLT is registered (310), the PON slicing device 100 registers a logical OLT device in the HW abstraction block 112 (320). To register a new pONU, a pONU discovery procedure is performed (330), and then the ONU adapter in the HW abstraction block 112 sets a data path of a UNI/ANI/PON/NNI through a pONU and the OMCI (340). OMCI MIB information may include an Alloc-ID, a GEM port, a P-bit mapper, a media access control (MAC) bridge service profile, a VLAN tag, and the like. Since the foregoing OMCI MIB is known technology, detailed description thereof will be omitted. The controller block 111 acquires physical device information, such as a port ID and a port number, (350), generates slice information, such as a port number, a slice-specific flow, bandwidth, DBA type, and the like, (360), checks a remaining bandwidth (RBW) of a PON port for which a slice will be configured (370), and then when a required bandwidth is smaller than an RBW, sets a slice-specific PON port, flow, bandwidth, and DBA type (380), or when the required bandwidth is larger than the RBW, searches for an available PON port of which an RBW may accommodate the required bandwidth (390) and then sets a slice-specific PON port, flow, bandwidth, and DBA type (380).

Figure 4:
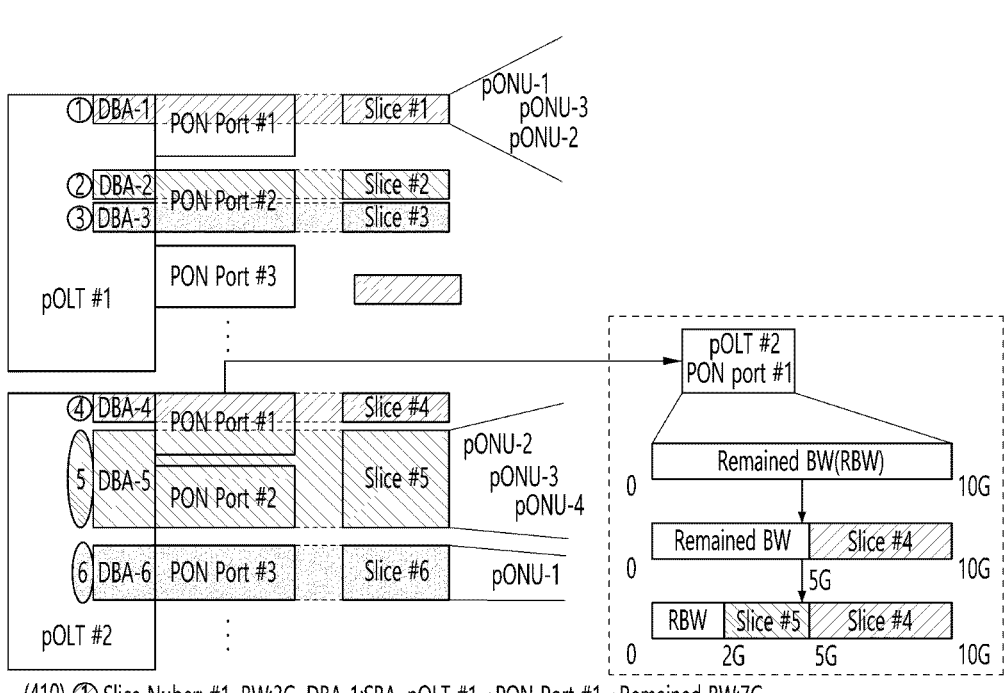
FIG. 4 is a diagram illustrating a slice-specific bandwidth/dynamic band allocation (DBA) allocation and management structure in the case of OLT/ONU registration according to an exemplary embodiment of the present invention.

FIG. 4 is a diagram illustrating a slice-specific bandwidth/DBA allocation and management structure in the case of OLT/ONU registration according to an exemplary embodiment of the present invention.

Slice-specific bandwidth allocation is managed as <a slice number, a bandwidth, a DBA type, an OLT number, a PON port, an RBW>, and a T-CONT number or a UNI port of an ONU is logically mapped to a corresponding slice number. A reference number 410 represents that a guaranteed bandwidth of 3 gigahertz is allocated to slice number 1, DBA is set to SBA, and an RBW of PON port number 1 corresponding to pOLT number 1 is 7 gigahertz.

A reference number 420 represents that a guaranteed bandwidth of 5 gigahertz is allocated to slice number 2, DBA is set to SBA, and an RBW of PON port number 2 corresponding to pOLT number 1 is 5 gigahertz, and a reference number 430 represents that a guaranteed bandwidth of 5 gigahertz is allocated to slice number 3, DBA is set to SR-DBA, and the RBW of PON port number 2 corresponding to pOLT number 1 is finally 0 gigahertz.

A reference number 440 represents that a guaranteed bandwidth of 5 gigahertz is allocated to slice number 4, DBA is set to SR-DBA, and an RBW of PON port number 1 corresponding to pOLT number 2 is 5 gigahertz.

A reference number 450 represents that DBA of slice number 5 is set to SR-DBA. To allocate a guaranteed bandwidth of 13 gigahertz, a guaranteed bandwidth of 3 gigahertz is allocated to PON port number 1 corresponding to pOLT number 2, and a guaranteed bandwidth of 10 gigahertz is allocated to PON port number 2 corresponding to pOLT number 2. Accordingly, an RBW of PON port number 1 is 2 gigahertz, and an RBW of PON port number 2 is 0 gigahertz.

A reference number 460 represents that a guaranteed bandwidth of 10 gigahertz is allocated to slice number 6, DBA is set to Co-DBA, and an RBW of PON port number 3 corresponding to pOLT number 2 is 0 gigahertz.

FIG. 5 is a table showing a state transition map of the abstraction core in the HW abstraction block 112 according to an exemplary embodiment of the present invention.

The state transition map includes device types, administration (admin.) states, connection states, and operational states, and the device types may be OLT, ONU, and any (OLT/ONU). The admin. states are pre-provisioned, enabled, disabled, unknown, and downloading image. The connection states are unknown, reachable, and unreachable. The operational states are unknown, active, activating, and discovered. The transition stages of the state transition map show stage-specific states in a pOLT or pONU registration or flow setting and activation flowchart for convenience of description.

Figure 6:
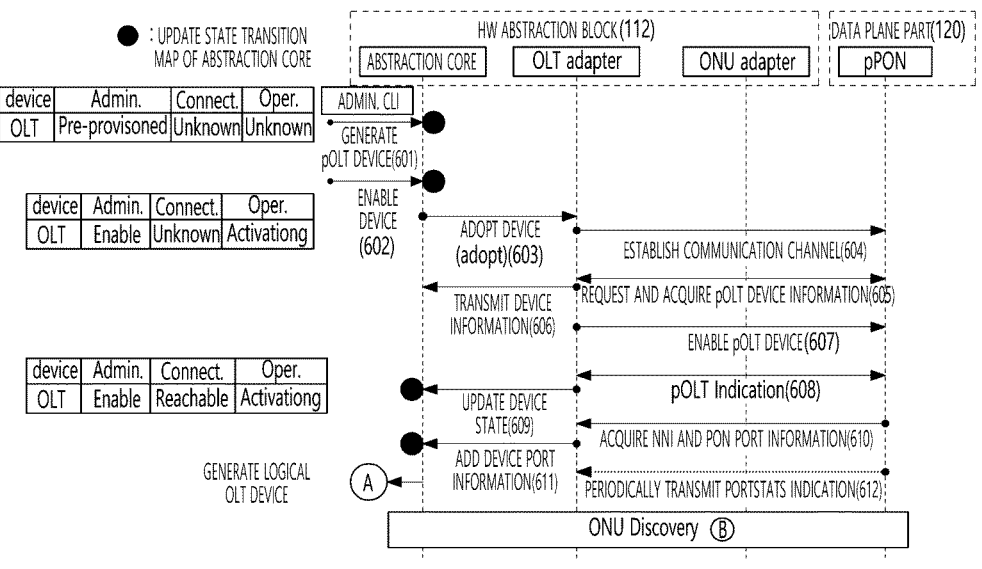
FIG. 6 is a diagram illustrating a new physical OLT (pOLT) registration flow and state transition according to an exemplary embodiment of the present invention.

FIG. 6 is a diagram illustrating a new physical OLT (pOLT) registration flow and state transition according to an exemplary embodiment of the present invention.

When the generation of a new pOLT device (601) is started through an admin. CLI, an admin. state in a state transition map is updated with the pre-provisioned state. When the device generation is completed, the device is enabled (602). After that, the admin. state in the state transition map may be updated with the enable state, and an operational state may be updated with the activating state.

The abstraction core function of the HW abstraction block 112 may transmit a command to adopt a device (603) to the OLT adapter, and the OLT adapter may request communication channel (e.g., Google remote procedure call (gRPC)) connection (604) from an abstraction agent block in the data plane part 120.

When the communication channel is established, the OLT adapter may request and acquire pOLT device information from the abstraction agent block in the data plane part 120 (605). After that, the OLT adapter may transmit the acquired device information to the abstraction core (606) and transmit a pOLT device enable command to the abstraction agent block in the data plane part 120 (607).

When pOLT indication information is received from the data plane part 120 (608), the OLT adapter may request a device state update from the abstraction core (609), and the abstraction core may update a connection state and the operational state in the state transition map with the reachable state and the activating state, respectively.

When NNI and PON port information is acquired from the data plane part 120 (610), the OLT adapter may transmit a device port information addition request to the abstraction core (611) and receive a periodic portstats indication from the data plane part 120 (612), and the abstraction core may perform operation A of generating a logical OLT device. Also, the HW abstraction block 112 and the data plane part 120 may perform ONU discovery operation B.

Figure 7:
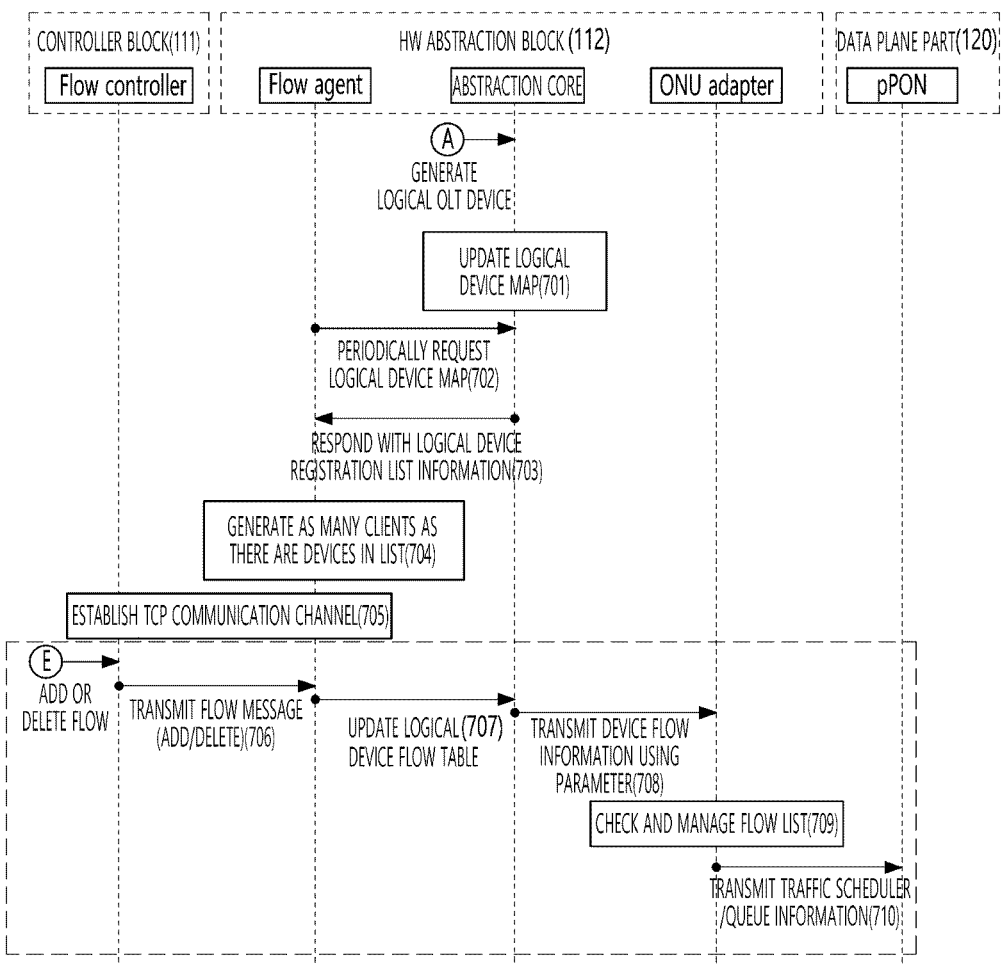
FIG. 7 is a sequence diagram illustrating a logical OLT device generation and flow setting flow according to an exemplary embodiment of the present invention.

FIG. 7 is a sequence diagram illustrating a logical OLT device generation and flow setting flow according to an exemplary embodiment of the present invention.

In logical OLT device generation operation A of FIG. 6 described above, the abstraction core may update a logical device map (701) and respond to a periodic logical device map request (702) from the flow agent of the HW abstraction block 112 with logical device registration list information (703).

The flow agent receiving the logical device registration list may generate as many clients as there are devices in the list (704) and complete establishment of a transmission control protocol (TCP) communication channel with the flow controller of the controller block 111 (705).

A flow addition or deletion sequence is performed in accordance with a flow message (e.g., an OpenFlow message) generated by the controller block 111. When a new logical device is generated, a flow addition sequence is performed in operation E of performing flow addition or deletion, and the flow agent may receive a flow addition message through the communication channel established in operation 705 (706).

When the flow addition message is received in operation 706, the flow agent requests a logical device flow table update from the abstraction core (707), and the abstraction core transmits device flow information to the ONU adapter using a parameter (708). The ONU adapter performs a flow list check and management operation (709) and then transmits traffic scheduler and queue setting information to the data plane part 120 (710).

Figure 8:
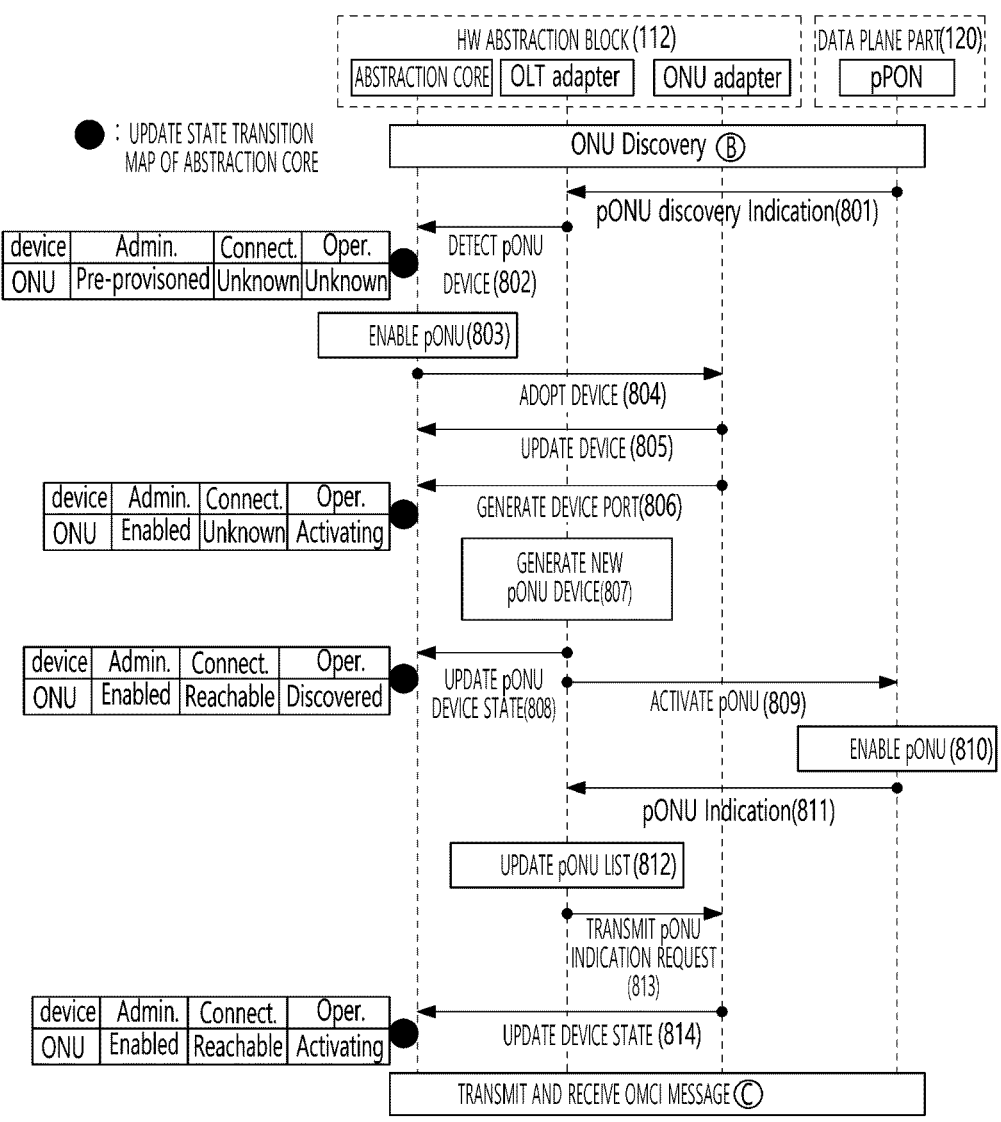
FIG. 8 is a sequence diagram illustrating a physical ONU (pONU) registration and activation flow and state transition according to an exemplary embodiment of the present invention.

FIG. 8 is a sequence diagram illustrating a pONU registration and activation flow and state transition in the PON slicing method according to an exemplary embodiment of the present invention.

When a pOLT in the data plane part 120 discovers a pONU in ONU discovery operation B of FIG. 6 described above, the pOLT may transmit a pONU discovery indication to the OLT adapter in the HW abstraction block 112 through an abstraction agent block of the data plane part 120 (801), and the OLT adapter may notify the abstraction core that the pONU device has been detected (802). The abstraction core may update the state transition map, enable the pONU (803), and then notify the ONU adapter of device adoption (804). Then, the ONU adapter may check the device and then request a device update (805) and device port generation (806). After operations 805 and 806, the abstraction core may update the state transition map for the device-type ONU.

After operation 801, the OLT adapter may perform a process of generating a new pONU device (807). After operation 807, the OLT adapter may request a pONU device state update from the abstraction core (808), and the abstraction core may update the connection state and the operational state in the state transition map with the reachable state and the discovered state, respectively. After operation 807, the OLT adapter may issue a pONU activation command to the data plane part 120 (809), and then the data plane part 120 may enable the pONU (810). When the pONU is enabled, the data plane part 120 may transmit a pONU indication from the OLT adapter (811), and the OLT adapter may perform a pONU list update (812). When the list update is completed, the OLT adapter may transmit a pONU indication request to the ONU adapter (813), the ONU adapter may request a device state update from the abstraction core (814), and then the abstraction core may update the operational state in the state transition map with the activating state. After operation 814, the HW abstraction block 112 and the data plane part 120 may perform operation C of transmitting and receiving an OMCI message for setting a data path.

Figure 9:
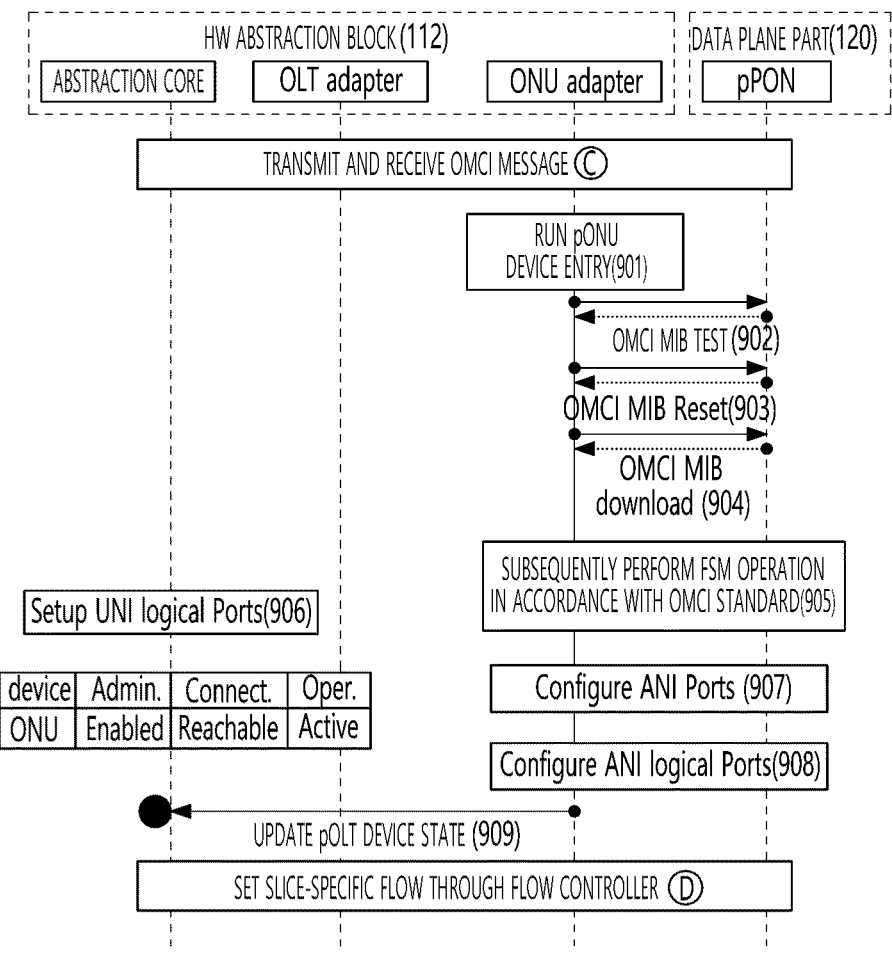
FIG. 9 is a sequence diagram illustrating a data path setting flow through an ONU management control interface (OMCI) according to an exemplary embodiment of the present invention.

FIG. 9 is a sequence diagram illustrating a data path setting flow through an OMCI according to an exemplary embodiment of the present invention.

When the ONU adapter in the HW abstraction block 112 runs pONU device entry (901) in OMCI message transmission and reception operation C of FIG. 8 described above, operation 902, operation 903, and operation 904 may be performed, and then a finite state machine (FSM) may operate in accordance with an OMCI standard (G.988) (905). After transmission and reception of an OMCI message is completed according to the FSM, the abstraction core may set up a UNI logical port (906), and the ONU adapter and the data plane part 12 may complete ANI port configuration (907) and UNI logical port configuration (908). The ONU adapter in the HW abstraction block 112 requests a pONU device state update from the abstraction core (909), and then the abstraction core updates the operational state in the state transition map with the active state. After operation 909 is completed, operation D of setting a slice-specific flow may be performed by the flow controller.

Figure 10:
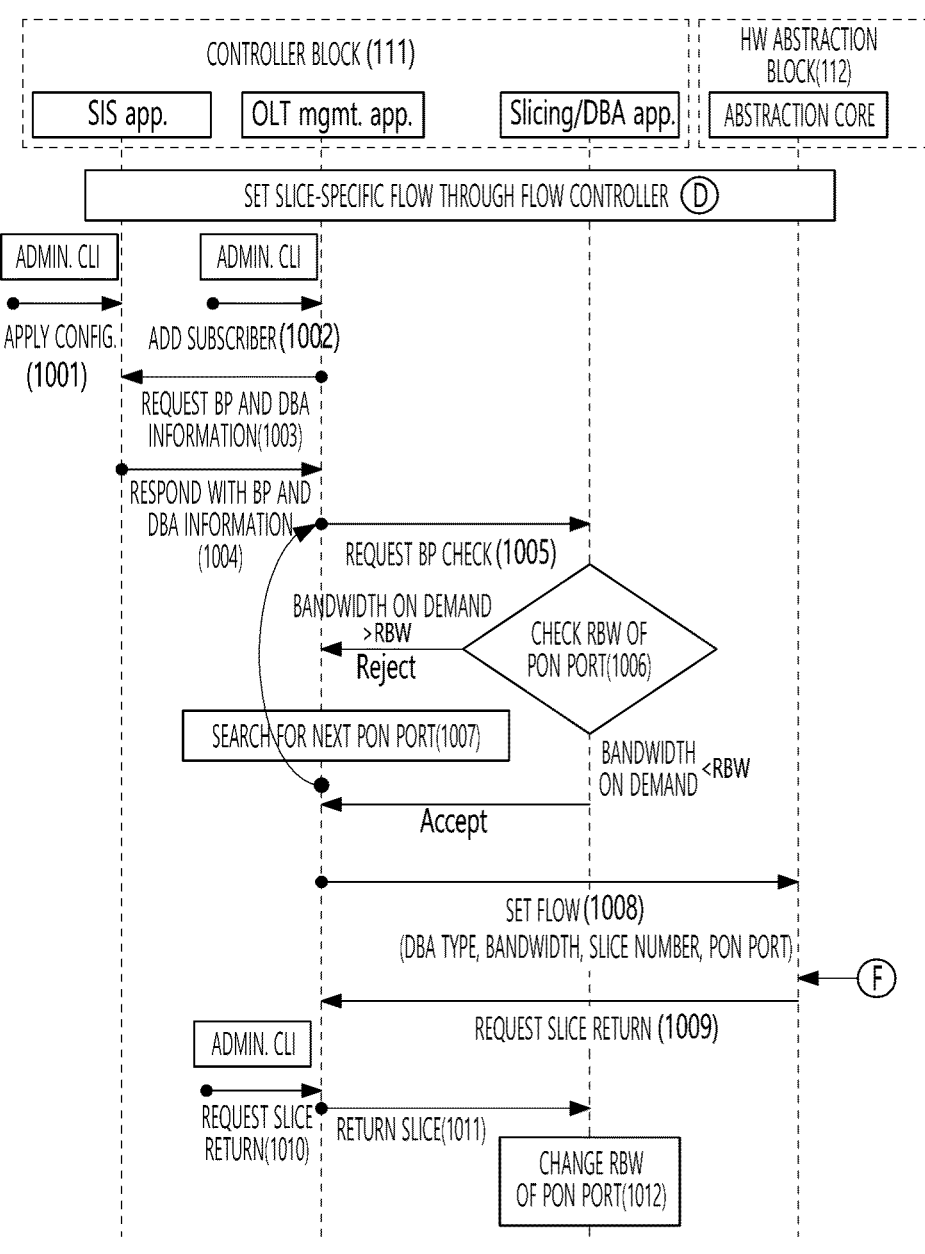
FIG. 10 is a sequence diagram illustrating a slice-specific flow generation/return flow through flow messages according to an exemplary embodiment of the present invention.

FIG. 10 is a sequence diagram illustrating a slice-specific flow generation/return flow through flow messages according to an exemplary embodiment of the present invention.

After a configuration (config.) is applied to the SIS app in the controller block 111 through the admin. CLI (1001) and a subscriber addition command is input to the OLT mgmt. app through the admin. CLI (1002) in the flow controller's slice-specific flow setting operation D of FIG. 9 described above, the OLT mgmt. app may request basic information (a parameter of a bandwidth-related service, VLAN information, a profile map, and the like) of a BP and DBA information from the SIS app (1003), and the SIS app may respond with BP and DBA information (1004).

In the BP, the used parameter may vary depending on a type of BP defined in the Metro Ethernet Forum (MEF) or the International Telecommunication Union Telecommunication standardization sector (ITU-T), and the BP may have a bandwidth rate (a committed information rate (CIR), an excess information rate (EIR), a peak information rate (PIR), or the like) and a burst size (a committed burst size (CBS), an excess burst size (EBS), a peak burst size (PBS), and the like) used in a token bucket. The OLT mgmt. app may request the slicing/DBA app to check a BP (1005), and the slicing/DBA app may check an RBW of a PON port (1006). When a required bandwidth is larger than the RBW, the slicing/DBA app rejects the request of the OLT mgmt. app, and the OLT mgmt. app may request a BP check again (1005) after an operation of searching for a next PON port (1007).

When the required bandwidth is smaller than the RBW in operation 1006, the slicing/DBA app may transmit an accept message to the OLT mgmt. app, and the OLT mgmt. app may transmit flow setting values (a DBA type, a bandwidth, a slice number, a PON port, and the like) to the abstraction core in the HW abstraction block 112 (1008). When operation F of generating a pPON slice return event is performed at any point in time, the abstraction core in the HW abstraction block 112 may request the OLT mgmt. app in the controller block 111 to return the slice (1009). The slice return event occurs when a pPON disable condition is met, and may mainly be caused by the admin. CLI, a pONU shutdown, a pONU disable event, and a pOLT disable event. When a slice return request is made through the admin. CLI (1010) or by a pONU shutdown, a pONU disable event, and a pOLT disable event, the OLT mgmt. app may return the slice to the slicing/DBA app (1011), and the slicing/DBA app may change the RBW to reflect the returned bandwidth of the PON port (1012).

Figure 11:
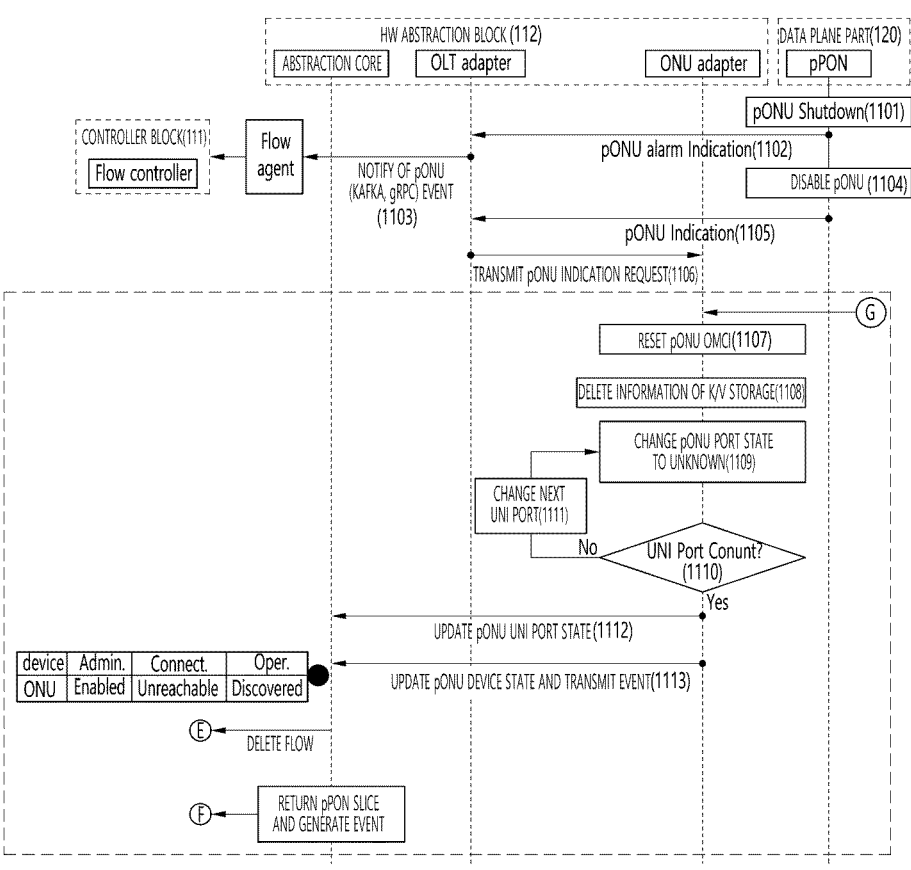
FIG. 11 is a sequence diagram illustrating a logical device management flow caused by a pONU shutdown according to an exemplary embodiment of the present invention.

FIG. 11 is a sequence diagram illustrating a logical device management flow caused by a pONU shutdown according to an exemplary embodiment of the present invention.

When a pONU shutdown occurs in the data plane part 120 (1101), the abstraction agent block transmits a pONU alarm indication to the OLT adapter in the HW abstraction block 112 (1102), and at this time, the pOLT is kept in an enable state. The OLT adapter notifies the flow agent that a pONU event has occurred through inter-container communication (e.g., KAFKA, gRPC, or the like) (1103), and the flow agent transmits a reception event to the flow controller in the controller block 111. After operation 1102, the data plane part 120 may disable the pONU (1104) and transmit a pONU indication to the OLT adapter (1105), and the OLT adapter may transmit the received pONU indication to the ONU adapter (1106). After operation G of pOLT disable conditions in FIG. 12, the ONU adapter may reset a pONU OMCI (1107), delete information of a key/value (K/V) storage (1108), and change a pONU port state to unknown (1109). To reflect all UNI port states of the pONU in operation 1109, UNI ports may be counted (1110). When there is a remaining port which has not been changed, the ONU adapter may change a next UNI port (1111) and repeat operation 1109. When there is no remaining port, the ONU adapter may request the abstraction CORE to update a pONU UNI port state (1112). When the pONU device state update request and event are received from the ONU adapter (1113), the abstraction core updates the connection state and the operational state in the state transition map with the unreachable state and the discovered state, respectively. After the state transition map is updated, the abstraction core may perform operation E of deleting a flow from the flow controller in the controller block 111 and operation F of generating a pPON slice return event.

Figure 12:
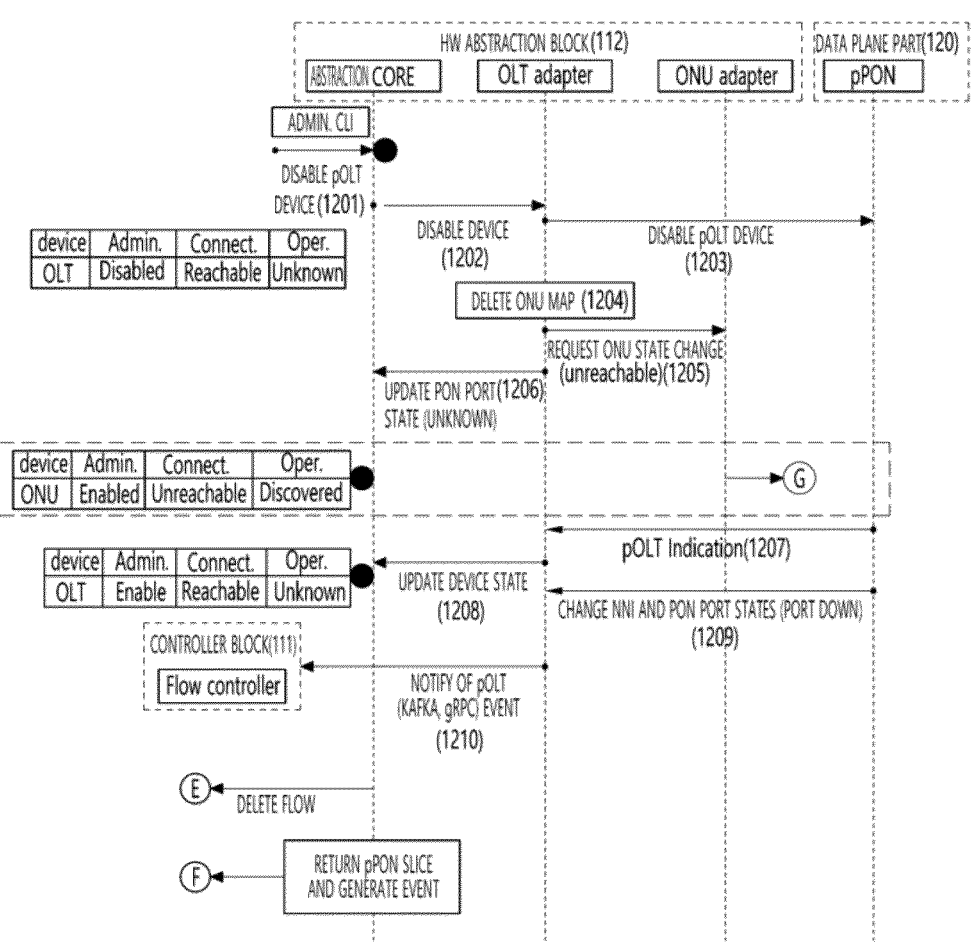
FIG. 12 is a sequence diagram illustrating a slice management flow caused by a pOLT disable event according to an exemplary embodiment of the present invention.

FIG. 12 is a sequence diagram illustrating a slice management flow caused by a pOLT disable event in the PON slicing method according to an exemplary embodiment of the present invention.

When a pOLT device disable command is issued to the abstraction core in the HW abstraction block 112 through the admin. CLI, the abstraction core updates the admin. state and the operational state in the state transition map with the disabled state and the unknown state, respectively. After the abstraction core transmits the device disable command to the OLT adapter (1202), the OLT adapter transmits the command to the data plane part 120 (1203), deletes an ONU map (1204), and then requests the ONU adapter connected to the pOLT to change all ONU states to unreachable (1205) and requests the abstraction core to update the PON port state with the unknown state (1206). The abstraction core updates the state transition map of the device-type ONU with the unreachable state and the discovered state, and the ONU adapter performs the process subsequent to operation G described in FIG. 11. After the update of the state transition map is completed by the abstraction core, the OLT adapter receives a pOLT indication from the data plane part 120 (1207) and then requests a device state update from the abstraction core (1208). The abstraction core updates the state transition map of the device-type OLT with the disabled state and the unknown state. When a request to change NNI and PON port states to "port down" is received from the data plane part 120 (1209) after operation 1208, the OLT adapter notifies the flow controller in the controller block 111 that a pOLT event has occurred through the flow agent by inter-container communication (e.g., KAFKA, gRPC, or the like) (1210). The abstraction core may perform operation E of deleting a flow and operation F of generating a pPON slice return event.

Figure 13:
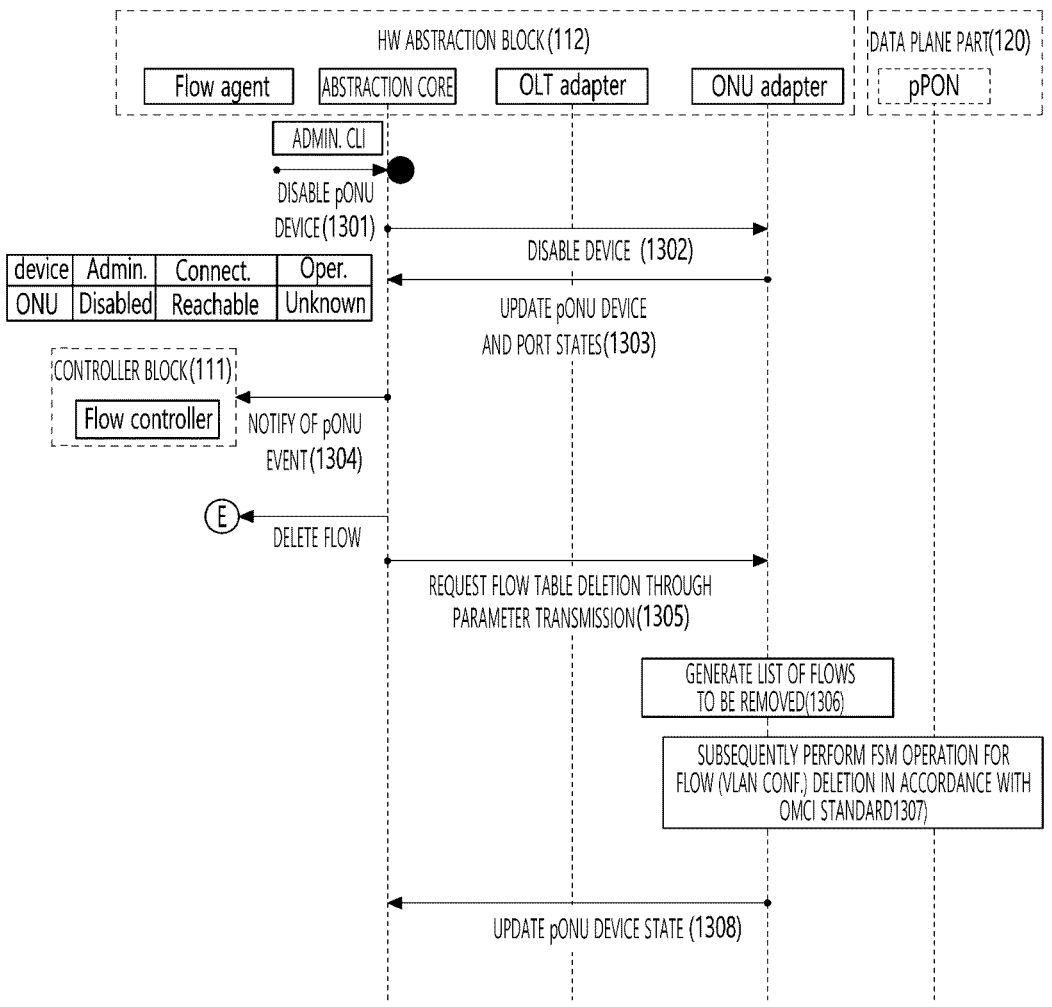
FIG. 13 is a sequence diagram illustrating a slice management flow caused by a pONU disable event according to an exemplary embodiment of the present invention.

FIG. 13 is a sequence diagram illustrating a slice management flow caused by a pONU disable event according to an exemplary embodiment of the present invention.

When a pONU device disable command is issued to the abstraction core in the HW abstraction block 112 through the admin. CLI (1301), the abstraction core may update the admin. state and the operational state in the state transition map with the disabled state and the unknown state, respectively. The abstraction core may transmit the device disable command to the ONU adapter (1302), and then the ONU adapter may request the abstractor core to update a pONU device state and a port state (1303). The abstraction core may notify the flow controller in the controller block 111 that a pONU event has occurred through the flow agent in the HW abstraction block 112 by inter-container communication (e.g., KAFKA, gRPC, or the like) (1304). The abstraction core may perform operation E of deleting a flow, and the ONU adapter may receive a flow table deletion request through parameter transmission (1305) and generate a list of flows to be removed (1306). The ONU adapter and the data plane part 120 may perform an FSM operation for flow (e.g., a VLAN configuration and the like) deletion in accordance with an OMCI standard (G.988) (1307). After operation 1307 is completed, the ONU adapter may request a pONU device state update from the abstraction core (1308) to notify the abstraction core of the reason that a flow has been deleted by the OMCI.

An exemplary embodiment of the present invention provides a physical network resource management method of removing a physical network's dependency on HW in separating network elements of an optical access network configured as a fixed-function device in an integrative manner into a data plane (HW) and a control plane (SW) using an abstraction/virtualization technology and providing physical network resources to slices in port/traffic-scheduler units by controlling and managing the optical access network through a centralized controller using one piece of logical equipment. Accordingly, it is possible to rapidly build a structure of an optical access network for each service.

According to an exemplary embodiment of the present invention, it is possible to provide flexible service management in a vPON and subdivided optical access network slicing for each subscriber group by controlling attributes, such as a maximum/guaranteed bandwidth, priority, a relative weight, a latency class, and DBA, through dynamic slice instance setting in centralized integrated control.

According to an exemplary embodiment of the present invention, a virtual network is configured by mapping a plurality of ONUs present in a physical optical access network to logical PON slices, and various bandwidth allocation methods are appropriately selected and controlled for service requirements in the virtual network. Accordingly, it is possible to assign identical ONUs or multiple ONUs to one PON slice for each slice service type and simultaneously assign one ONU to a plurality of PON slices at the same time, which allows flexible network management.

According to an exemplary embodiment of the present invention, it is possible to provide optical access infrastructure for a mobile service as well as a wired service by configuring various services to be used by ONUs in a subdivided manner from limited optical access network resources on the basis of a combination of dynamically configurable technology/bandwidth/slice profiles.

According to an exemplary embodiment of the present invention, for the purpose of preventing the sum of maximum bandwidths of PON slices from exceeding a maximum bandwidth of each PON port set in a pPON, it is possible to provide a dynamic bandwidth allocation control method for managing total bandwidth and currently remaining bandwidth information for each PON port, determining whether a currently remaining bandwidth is exceeded when provisioning of a new slice instance is requested, and determining whether a bandwidth allocated to a corresponding subscriber is smaller than a remaining bandwidth of a slice instance to be provisioned when the subscriber is provisioned.

The exemplary embodiments of the present invention described above are implemented not only through a device and method but also through a program or a recording medium on which the program is recorded.

Although the exemplary embodiments of the present invention have been described in detail above, the scope of the present invention is not limited thereto, and various modifications and alterations based on the basic concept of the present invention defined in the following claims also fall within the scope of the present invention.

The above description is detailed embodiments for implementing the present invention. The present invention includes not only the above-described exemplary embodiments but also embodiments that can be obtained by simply changing the design or can be simply changed. In addition, the present invention includes technologies for readily implementing modified embodiments. Therefore, the scope of the present invention is not limited to the above-described embodiments and should be determined on the basis of equivalents for the claims of the present invention as well as the claims.

What is claimed is:

1. An operating method of an electronic device, the operating method comprising:
   identifying network elements included in a plurality of physical passive optical networks (pPONs);
   abstracting the identified network elements so that the identified network elements are recognized as the same software (SW) block;
   generating a plurality of PON slices by performing PON slicing on the abstracted network elements in accordance with a predetermined reference; and
   generating a plurality of virtual PONs (vPONs) by mapping the plurality of PON slices to at least one network element,
   wherein the predetermined reference is determined on the basis of an attribute of at least one of ports and transmission containers (T-CONTs) corresponding to the identified network elements,
   the at least one network element includes an optical network unit (ONU), and
   the identified network elements included in the plurality of pPONs are separated into a data plane and a control plane.

2. The operating method of claim 1, further comprising transmitting and receiving data through network elements on the data plane mapped to the plurality of generated vPONs.

3. The operating method of claim 2, wherein the transmitting and receiving of the data further comprises allocating bandwidths to the plurality of vPONs using a bandwidth allocation method varying depending on a service type provided by a service provider in accordance with requirements of a user who uses the plurality of vPONs.

4. The operating method of claim 1, wherein the generating of the plurality of vPONs further comprises generating a plurality of vPONs in the control plane by reconfiguring the plurality of abstracted network elements in accordance with a service type provided by a service provider.

5. The operating method of claim 1, wherein the attribute of the at least one of the ports and the T-CONTs is an attribute related to at least one of a maximum bandwidth, a guaranteed bandwidth, priority, a relative weight, a latency class, and a dynamic bandwidth allocation (DBA) type.

6. The operating method of claim 1, further comprising:
   identifying a new network element;
   identifying port information corresponding to the new network element;
   acquiring PON slice information corresponding to the port information;
   identifying a PON port for the PON slicing on the basis of the PON slice information;
   determining whether a remaining bandwidth (RBW) of the identified PON port satisfies a predetermined bandwidth on demand; and
   when the RBW of the identified PON port satisfies the predetermined bandwidth on demand, setting the PON slice information,
   wherein the PON slice information includes information related to at least one of the PON port, a flow, a bandwidth, and dynamic bandwidth allocation (DBA).

7. The operating method of claim 6, further comprising:
   when the RBW of the identified PON port does not satisfy the predetermined bandwidth on demand, identifying another PON port on the basis of the PON slice information; and
   determining whether an RBW of the identified PON port satisfies the predetermined bandwidth on demand.

8. An electronic device comprising:
   a transceiver; and
   at least one controller operably connected to the transceiver,
   wherein the at least one controller is configured to identify network elements included in a plurality of physical passive optical networks (pPONs), abstract the identified network elements so that the identified network elements are recognized as the same software (SW) block, generate a plurality of PON slices by performing PON slicing on the abstracted network elements in accordance with a predetermined reference, and generate a plurality of virtual PONs (vPONs) by mapping the plurality of PON slices to at least one network element,
   the predetermined reference is determined on the basis of an attribute of at least one of ports and transmission containers (T-CONTs) corresponding to the identified network elements,
   the at least one network element includes an optical network unit (ONU), and
   the identified network elements included in the plurality of pPONs are separated into a data plane and a control plane.

9. The electronic device of claim 8, wherein the at least one controller is further configured to transmit and receive data through network elements on the data plane mapped to the plurality of generated vPONs.

10. The electronic device of claim 9, wherein, to transmit and receive the data, the at least one controller is further configured to allocate bandwidths to the plurality of vPONs using a bandwidth allocation method varying depending on a service type provided by a service provider in accordance with requirements of a user who uses the plurality of vPONs.

11. The electronic device of claim 8, wherein, to generate the vPONs, the at least one controller is further configured to generate a plurality of vPONs in the control plane by reconfiguring the plurality of abstracted network elements in accordance with a service type provided by a service provider.

12. The electronic device of claim 8, wherein the attribute of the at least one of the ports and the T-CONTs is an attribute related to at least one of a maximum bandwidth, a guaranteed bandwidth, priority, a relative weight, a latency class, and a dynamic bandwidth allocation (DBA) type.

13. The electronic device of claim 8, wherein the at least one controller is further configured to identify a new network element, identify port information corresponding to the new network element, acquire PON slice information corresponding to the port information, identify a PON port for the PON slicing on the basis of the PON slice information, determine whether a remaining bandwidth (RBW) of the identified PON port satisfies a predetermined bandwidth on demand, and set the PON slice information when the RBW of the identified PON port satisfies the predetermined bandwidth on demand, and the PON slice information includes information related to at least one of the PON port, a flow, a bandwidth, and dynamic bandwidth allocation (DBA).

14. The electronic device of claim 13, wherein the at least one controller is further configured to, when the RBW of the identified PON port does not satisfy the predetermined bandwidth on demand, identify another PON port on the basis of the PON slice information and determine whether an RBW of the identified PON port satisfies the predetermined bandwidth on demand.

* * * * *